L. WILSON.
ROLLER BEARING.
APPLICATION FILED DEC. 18, 1918.

1,327,003. Patented Jan. 6, 1920.

Witnesses:
Robert F. Weir
Arthur W. Carlson

Inventor
Luloff Wilson
Force Bain & Bean
Attys.

L. WILSON.
ROLLER BEARING.
APPLICATION FILED DEC. 18, 1918.

1,327,003.

Patented Jan. 6, 1920.

Witnesses:
Robert H. Weir
Arthur W. Carlson

Inventor
Luloff Wilson
Force Bain & May
Attys.

UNITED STATES PATENT OFFICE.

LULOFF WILSON, OF CHICAGO, ILLINOIS.

ROLLER-BEARING.

1,327,003. Specification of Letters Patent. Patented Jan. 6, 1920.

Application filed December 18, 1918. Serial No. 267,307.

*To all whom it may concern:*

Be it known that I, LULOFF WILSON, a citizen of the United States, residing at Chicago, in the county of Cook and State of Illinois, have invented certain new and useful Improvements in Roller-Bearings, of which the following is a specification.

My invention relates to improvements in roller bearings and has especial reference to means for holding the rollers properly spaced apart and in axial alinement, without clamping the rollers and without imposing undue friction to resist rotation thereof.

One of the objects of my invention is to improve structures of this character by providing a roller-holding cage or carriage that will allow limited movement of the rollers in every direction without permitting them to move materially out of axial alinement or out of the cage.

Another object of my invention is to simplify and cheapen the construction.

Other and further objects of my invention will become readily apparent to persons skilled in the art, from a consideration of the following description when taken in conjunction with the drawings, wherein—

In all the views the same reference characters are employed to indicate similar parts.

Figure 1:
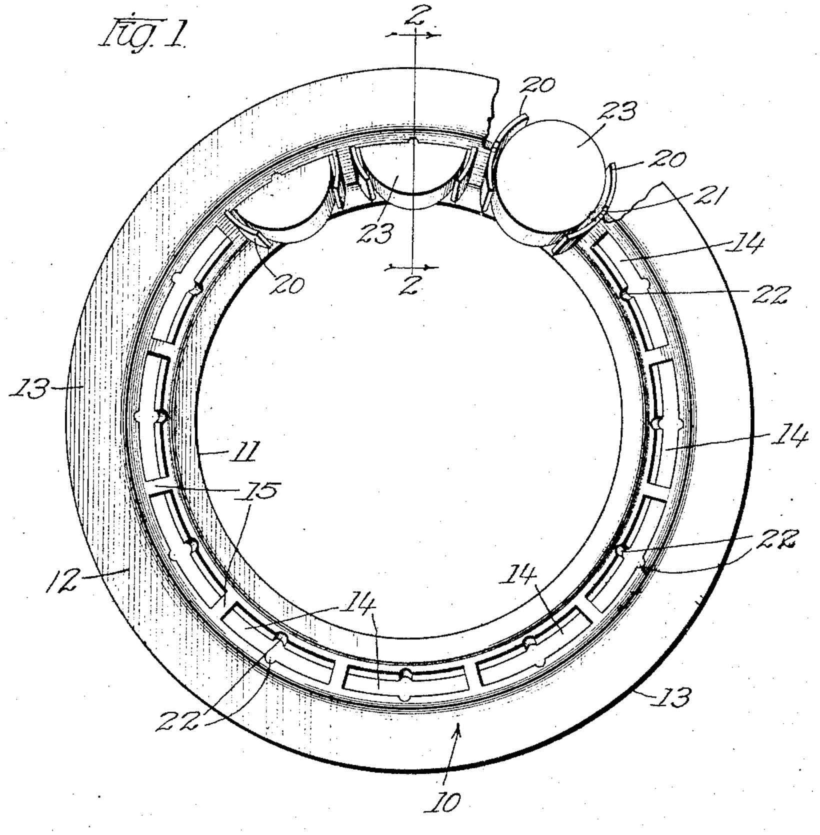
Figure 1 is an end view of a bearing member of a general conical form, looking at the larger end, showing parts broken away.
Figure 2:
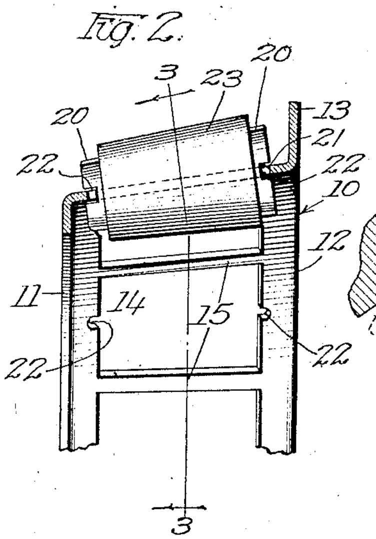
Fig. 2 is a fragmentary section taken on line 2—2 of Fig. 1.
Figure 6:
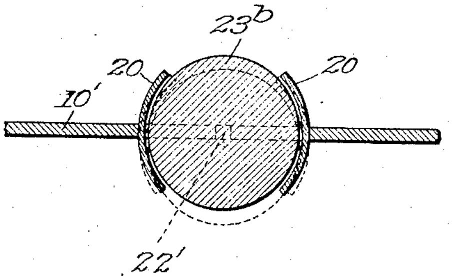
Fig. 6 is an enlarged section, taken on line 6—6 of Fig. 4, showing permissible movement of the roller and wings in dotted lines.

The cage 10 is preferably made of one piece of sheet metal, deformed as shown in Fig. 2, to constitute a ring 11 and a larger ring 12, both having an angular cross section to give them greater strength. The ring 12 having a radially projecting larger flange 13. Openings 14 are made at intervals between the rings, leaving connecting bars 15, therebetween, to join the rings together. When the improvement is to be applied to a thrust bearing, the cage frame 10′ may be made in disk form, as shown in Figs. 4 and 6, provided with openings $14^a$ and $14^b$ as the case may be, the former for a plurality of roller sections of uniform diameter, and the latter for tapered rollers as common in structures of this character.

Figure 3:
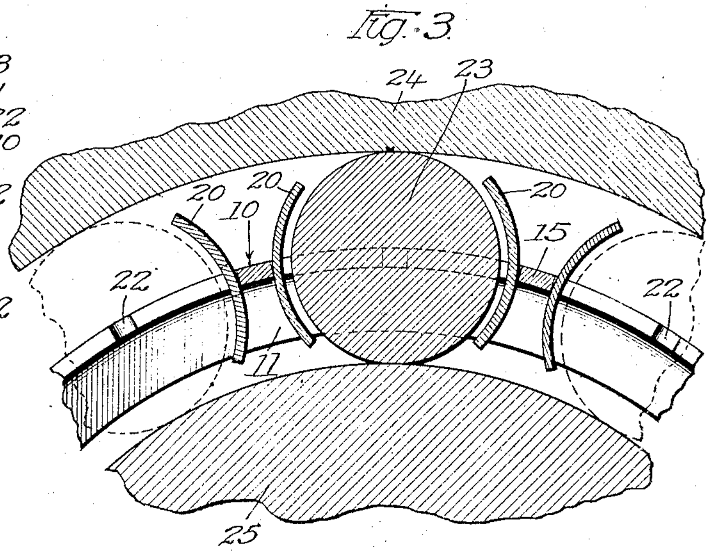
Fig. 3 is an enlarged fragmentary view in section, taken on line 3—3 of Fig. 2.

A roller retaining wing 20, transversely curved, is provided at its ends with notches 21, which notches hold the wing properly in place and permit slight rotary movement on its longest axis, when the said notches engage the respective parts of the frame on either side of the openings 14 and 14′. Midway of the narrowest dimensions of the openings 14, are notches 22, which are sufficiently wide to permit insertion of the wings 20. In assembling the cage parts and rollers, the wings are placed in the notches 22 until the notches 21 of the wings are in register with the notches 22, whereupon the wings are then slipped down to their proper positions in substantial contact with the cross members 15 and 15′. After the wings have been placed in position, they are moved as much as may be, as shown in dotted lines in Fig. 6, whereupon the rollers 23 are pressed into position against the resiliency of the wing structure, and the rollers will thereupon snap into place, as clearly shown in Fig. 3. The notches 22 are not necessarily required as the wings may be placed diagonally of the openings 14 and the notches 21 may then be placed astride the horizontal legs of the rings 11 and 12. 24 and 25 are the other bearing members upon which the rollers move, and which are common in structures of this character.

Figure 4:
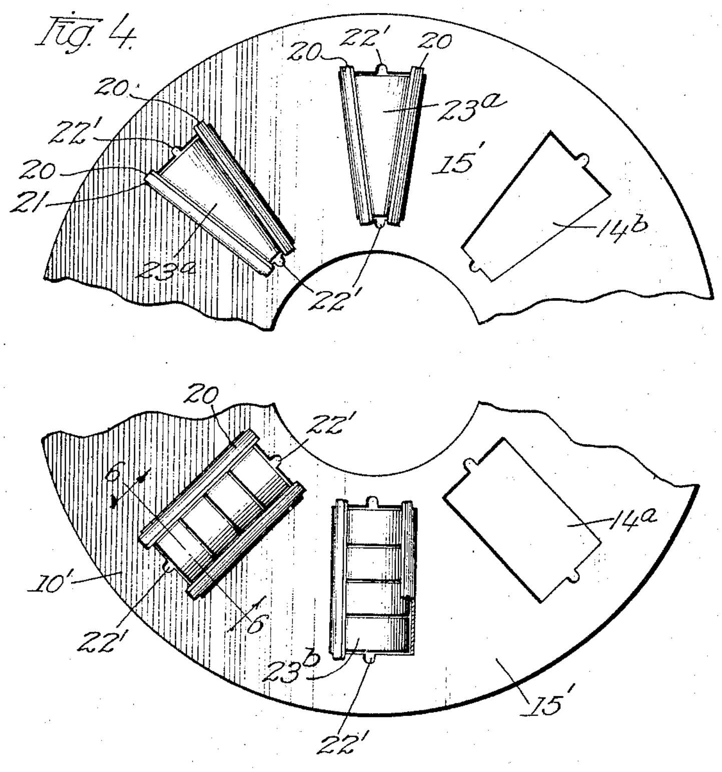
Fig. 4 shows face views of a modification of my invention, as applied to a thrust bearing.
Figure 5:
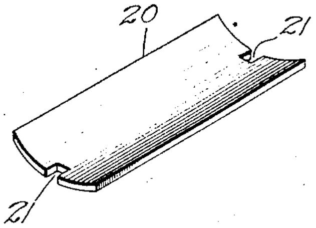
Fig. 5 is a perspective view of a roller-holding wing, for pivotal engagement with the cage frame.

In Fig. 4 I have shown tapered rollers $23^a$ in association with the same sort of wings 20, that are placed in tapered slots in the disk 10′. I have also shown composite rollers $23^b$ made up of a number of sectional disk members, all of which are properly held in the cage by the partially encompassing wings.

From the foregoing description, it will be manifest that my improved means of holding the rollers is as well adapted for bearing structures intended for shafts of uniform diameter, in which case the rings 11 and 12 will be of the same diameter instead of holding the rollers angularly disposed with reference to the axis of the shaft, as shown in Fig. 2.

Having described my invention, what I claim is:—

1. A roller bearing having in combination a cage frame, provided with roller-containing openings; a pair of transversely curved wings, pivoted in each said opening, and a roller between wings of each pair.

2. A roller bearing having in combination a cage frame, provided with roller-containing openings; a pair of transversely curved, resilient wings, pivoted in each opening and having limited free movement, and a roller between the wings of each pair of a diameter requiring flexing of the wings to permit its insertion.

3. A roller bearing having in combination a cage frame, provided with roller-containing openings; a pair of transversely curved, resilient wings, pivoted in each opening to partly surround the roller and having limited free movement not sufficient to permit removal of the roller, without flexing the wings, and a roller between the wings, of a diameter requiring flexing of the wings to permit its insertion.

4. A roller bearing comprising a cage frame having spaced apart roller-containing openings, each opening provided with notches in its ends; transversely curved wings insertible in each said opening through said notches and having notches in their ends to engage the walls of the respective openings to permit limited pivotal movement of the wings and a roller between the wings of a given opening.

5. A roller bearing having in combination two rings, each ring having an angular cross section with horizontal legs facing each other; spaced-apart bars holding the rings in spaced relation, and leaving openings therebetween for rollers; transversely curved wings having notches in each end, to engage the horizontal legs of the respective wings to hold them in place and to permit limited pivotal movement thereof, and a roller between the wings of a given opening.

6. A roller bearing having in combination two rings, each ring having an angular cross section with the horizontal legs of the two rings facing each other; integral spaced apart bars, joining the horizontal legs and holding the rings in spaced relation and leaving openings therebetween for rollers; transversely curved wings having notches in the mid-portion of each end to engage the horizontal legs of the respective wings to hold the wings in place and to permit limited pivotal movement and a roller between the wings of a given opening.

In testimony whereof I hereunto subscribe my name.

LULOFF WILSON.